(12) United States Patent
Shum

(10) Patent No.: US 6,300,744 B1
(45) Date of Patent: Oct. 9, 2001

(54) HIGH-EFFICIENCY BATTERY CHARGER

(75) Inventor: Kin E. Shum, Sunnyvale, CA (US)

(73) Assignee: Siliconix Incorporated, Santa Clara, CA (US)

( * ) Notice: Subject to any disclaimer, the term of this patent is extended or adjusted under 35 U.S.C. 154(b) by 0 days.

(21) Appl. No.: 09/502,546

(22) Filed: Feb. 10, 2000

(51) Int. Cl.[7] .......................... H01M 10/44; H01M 10/46
(52) U.S. Cl. ................................................ 320/137
(58) Field of Search ................................ 320/124, 127, 320/135, 137, 138, 140

(56) References Cited

U.S. PATENT DOCUMENTS 5,939,862    8/1999    Kates et al. ........................... 320/125

Primary Examiner—Edward H. Tso

(74) Attorney, Agent, or Firm—Skjerven Morrill MacPherson LLP; David E. Steuber

(57) ABSTRACT

Where an AC adapter is used to supply power to both an electronic device such as a notebook computer and a rechargeable battery, as where the computer is turned on while the battery is being recharged, the voltage at the output terminal of the AC adapter is detected and delivered to a battery charger that is used to supply a constant current to the battery. When the current from the AC adapter exceeds its rated current, the voltage at the output terminal begins to fall. When the output voltage falls below a predetermined trigger voltage, the voltage detector instructs the battery charger to limit the current delivered to the battery, and the current is reduced until the voltage at the output of the AC adapter again reaches the trigger voltage. This arrangement provides for a maximum use of the power available from the AC adapter when the combined power demands of the electronic device and the battery exceed the power delivery capability of the AC adapter.

12 Claims, 4 Drawing Sheets

HIGH-EFFICIENCY BATTERY CHARGER

FIELD OF THE INVENTION

This invention relates to battery chargers for portable electronic devices such as laptop computers and, in particular, to a battery charger that is relatively inexpensive to construct and yet substantially maximizes the power delivered to the battery when the electronic device is operating.

BACKGROUND OF THE INVENTION

Portable electronic devices such as cellular phones and laptop computers are in widespread use. A key feature of these devices is that they are battery operated, which allows them to be used in locations where AC power is not available. It is also important that the batteries be capable of powering the device for long periods of time and of being recharged in minimal periods, to maximize the time during which the device is available for use.

A particular problem occurs when the device is operated while its battery is being recharged. The AC/DC converter, commonly called an "AC adapter", that is used to supply DC power to the device is capable of delivering a certain amount of power. The battery charger, typically a DC/DC stepdown converter, is designed to deliver a fixed constant current to the battery, the magnitude of the current being determined by such factors as the battery characteristics, the AC adapter power level, and the charge time requirement. Considerations of size, weight and cost prevent the AC adapter from being made large enough to supply all of the power necessary to both operate the device and charge the battery simultaneously. Thus, some technique must be employed to assure that the device has sufficient power to operate in this situation. Ideally, the device would receive whatever power is necessary to operate it and all of the remaining power that the AC adapter is capable of delivering would be used to recharge the battery.

Several techniques have been used to address this problem. The simplest is illustrated in FIG. 1. Shown in FIG. 1 are an AC adapter 10, which could be any of a variety of AC/DC converters that are available on the market. The input terminal of AC adapter 10 is connected to a power main. The output terminal of AC adapter 10 is connected to a load 11, which could be, for example, a laptop computer, and through a battery charger 12 (a DC/DC stepdown converter) to a rechargeable battery 13, which powers load 11 when AC adapter 10 is not being used.

Since the voltage of rechargeable battery 13 varies from, for example, 2.7 volts when it is fully discharged to 4.2 volts when it is fully charged, battery charger 12 in the form of a DC/DC stepdown converter is necessary to ensure that the voltage supplied to the input terminal of battery 13 is at the proper level. The output voltage of AC adapter 10 is fixed at, for example, 5 volts ±5%. The structure of battery charger 12 is well known to those skilled in the art and will not be described in detail here. See, e.g., P. T. Krein, *Elements of Power Electronics,* Oxford University Press (1998). A driver 120 supplies signals over the lines designated DH and DL to the gate terminals, respectively of a high-side MOSFET 121 and a low-side MOSFET 122, which are connected in series between the input terminal of battery charger 12 and ground. The signals from driver 120 turn on MOSFETs 121 and 122 on and off in sequence, MOSFET 121 being on when MOSFET 122 is off, and vice-versa. To prevent current shoot-through from AC adapter 10 to ground, there is a "break-before-make" interval between the instant that one of MOSFETs 121 or 122 is turned off and the other MOSFET is turned on. The current delivered by battery charger 12 is directly related to the percentage of the time that MOSFET 121 is turned on (sometimes referred to as the duty cycle).

The voltage at the common node 123 between MOSFETs 121 and 122 therefore alternates between the output voltage of AC adapter 10 and ground. This voltage is fed to a series LC circuit containing inductor 124 and capacitor 125, which alternately store and deliver energy such that a generally constant current is generated on line 126 to battery 13.

Battery charger 12 also contains circuitry which allows the size of the current delivered to battery 13 to be set. A current detector 127 connected to line 126 generates a signal indicating the size of the current in line 126. This signal is delivered over a feedback loop 128 to a charge current control 129. Charge current control 129 has a charge current set input which is set to the desired current to be delivered to battery 13. Charge current set 126 compares the set current against the current detected by detector 127 and delivers an error signal which causes driver to adjust the duty cycle of the pulses delivered to MOSFETs 121 and 122 in such a way that the current on line 126 equals the set current.

In the circuitry shown in FIG. 1 the condition of the load 11 being operative is detected and the driver 120 and hence battery charger 12 is simply disabled in this situation. This solves the problem, but the battery is not charged at all whenever the load is on, thereby forfeiting valuable charge time that might be available.

An alternative solution is illustrated in FIG. 2. Here, instead of disabling the driver 120, the current setting in charge current control 129 is adjusted such that battery charger 12 delivers a reduced fixed current to battery 13 when the load 11 is operating. While this allows some charging to take place while the load is operative, the reduced fixed current delivered to the battery must be set based on the assumption that the load is drawing full power. Thus, when the load is not drawing full power, the power delivered to the battery is lower than AC adapter 10 is capable of delivering.

A more sophisticated solution is illustrated in FIG. 3. A current sense resistor 30 is connected to the output terminal of AC adapter 10. A current sense unit 32 reads the voltage drop across current sense resistor 30 and sends a signal representing the magnitude of the current to a compare unit 33, where the signal is compared against a signal representing the rated current of AC adapter 10. If the current through resistor 30 is greater than the rated current, less a safety margin, charge current control 129 reduces the current delivered by battery charger 12 to battery 13. With this arrangement a considerable safety margin must be applied and thus not all the available power is actually used. Moreover, the circuitry must be set for the rated output current of each AC adapter with which it is used; and sensing the size of a current, particularly at the high output voltages of many AC adapters, tends to be expensive. U.S. Pat. No. 5,939,862 describes an arrangement somewhat similar to the one shown in FIG. 3.

SUMMARY OF THE INVENTION

According to this invention, an output terminal of a DC power source such as an AC/DC converter is connected both to an electronic device and to a battery charger. The battery charger contains a current control unit for regulating an magnitude of a current at an output terminal of the battery charger. A rechargeable battery is connected to the output terminal of the battery charger. A voltage detector is connected to the output terminal of the DC power source, and an output terminal of the voltage detector is connected to the current control unit. Thus, the voltage detector supplies to the current control unit a signal representing the magnitude of a voltage at the output terminal of the DC power source.

So long as the DC power source is operating within its rated power capability, the voltage at its output is at or within a predetermined margin of a predetermined output voltage. As the power output of the DC power source exceeds its rated power, the voltage at its output terminal begins to fall. This drop in voltage is sensed by the voltage detector and is used to reduce the current output by the battery charger to the battery until the output voltage of the DC power source is again within the predetermined margin of its rated output voltage.

Embodiments according to this invention have several distinct advantages over prior art arrangements. When both the electronic device and the battery are drawing power, the DC power source can operate at its rated power (or slightly above its rated power), so no available power is wasted. The battery is recharged in the minimal amount of time consonant with delivering the power needed by the electronic device. Sensing the voltage at the output terminal of the DC power source is relatively inexpensive as compared with sensing the current or power output by the DC power source. The circuitry can be used with any AC/DC converter or other type of DC power source that provides a fixed output voltage in normal operation, regardless of the power or current rating of the power source.

BRIEF DESCRIPTION OF THE DRAWINGS

The invention will be best understood by reference to the following drawings, in which like components have the same reference numerals.

DESCRIPTION OF THE INVENTION

Figure 1:
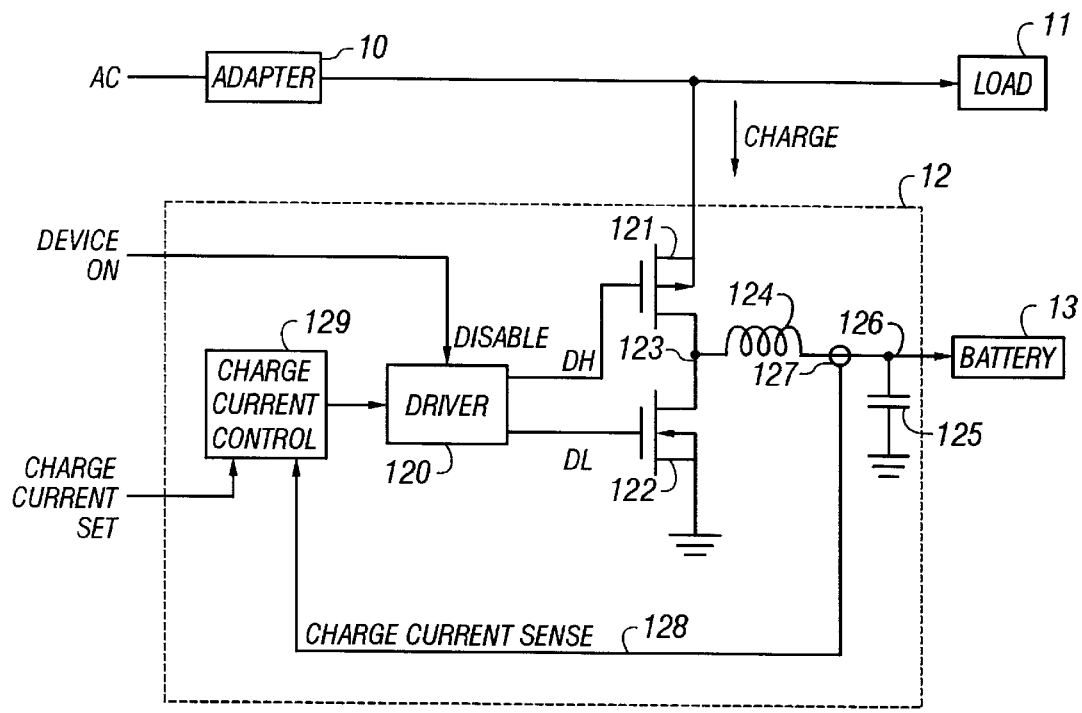
FIG. 1 is a schematic block diagram of a prior art circuit in which the battery charger is disabled whenever the electronic device is drawing power.
Figure 2:
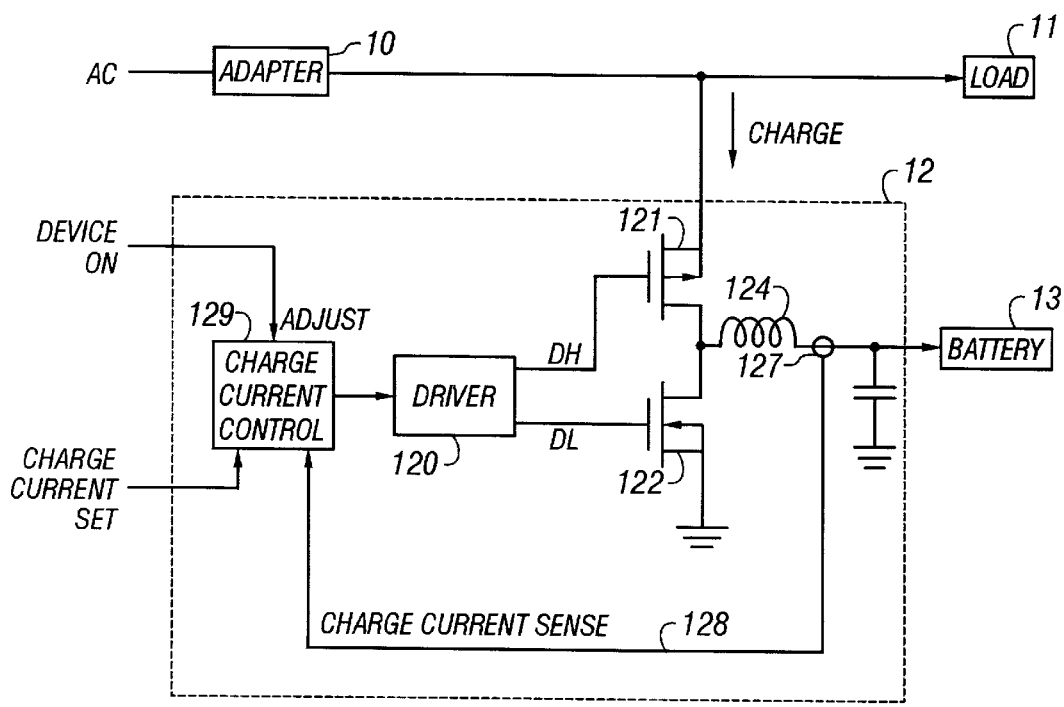
FIG. 2 is a schematic block diagram of a prior art circuit in which current delivered by the battery charger is reduced to a lower, predetermined level whenever the electronic device is drawing power.
Figure 3:
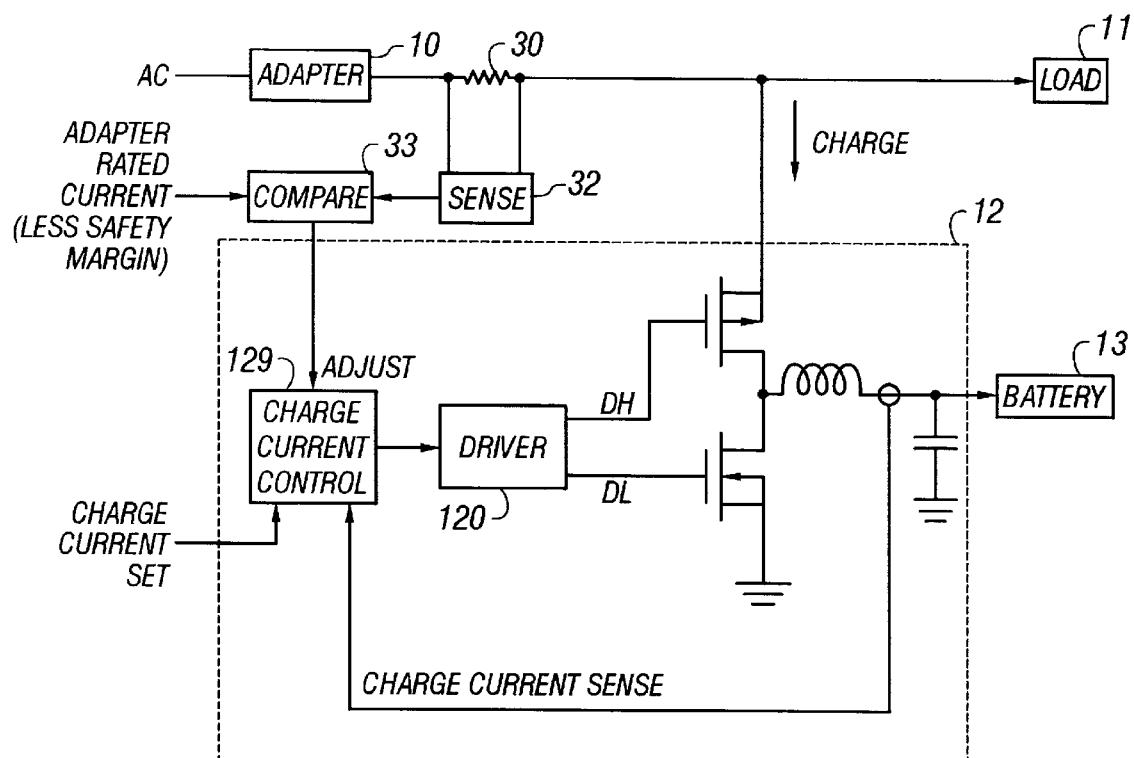
FIG. 3 is a schematic block diagram of a prior art circuit in which a power delivered by the AC adapter is detected, and the current delivered by the battery charger to the battery is regulated such that the AC adapter does not exceed its rated power less a predetermined safety margin.
Figure 4:
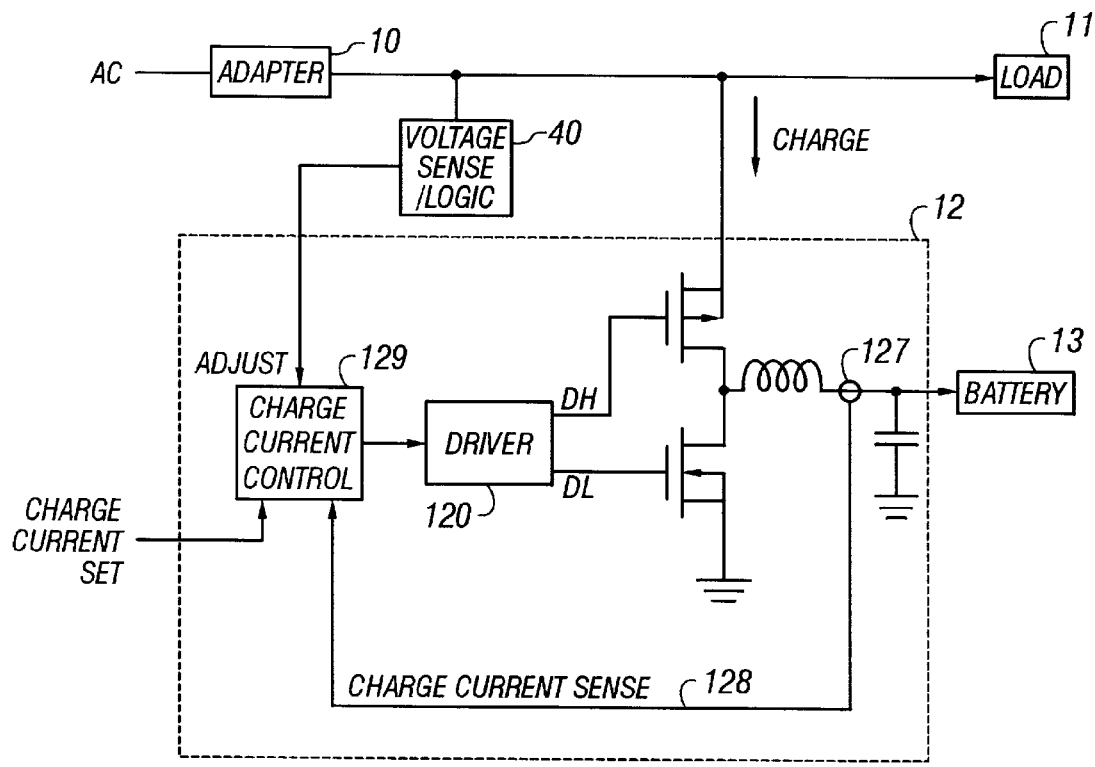
FIG. 4 is a schematic block diagram of an arrangement in accordance with this invention.

A schematic block diagram of an embodiment of this invention is shown in FIG. 4, which contains an AC adapter 10, a load 11, a battery charger (DC/DC converter) 12 and a rechargeable battery 13, all of which are connected together in a manner similar to the arrangements of FIGS. 1–3. In the arrangement of FIG. 4, however, a voltage sense/logic unit 40 is connected to the output terminal of AC adapter 10. Voltage sense/logic unit 40 delivers to the charge current control 129 a signal that is representative of the voltage at the output of AC adapter 10.

Figure 5:
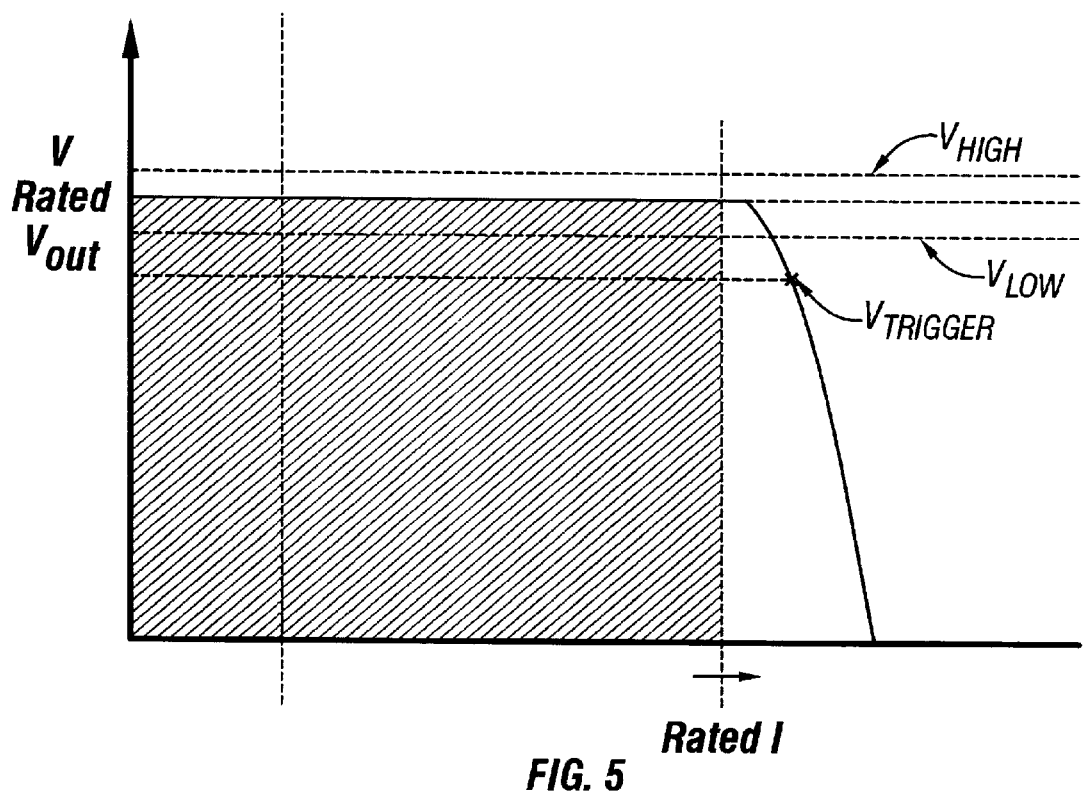
FIG. 5 is an illustrative graph showing voltage as a function of current at the output terminal of an AC adapter.

The manner in which this arrangement operates can best be understood by reference to FIG. 5, which a graph showing the current-voltage characteristic at the output terminal of an AC adapter or other type of DC power source. As indicated, the output voltage $V_{out}$ remains essentially constant at the rated value, fluctuating somewhat between $V_{high}$ and $V_{low}$, until the output current reaches the rated value. Thereafter, $V_{out}$ begins to fall quite rapidly.

Referring again to FIG. 4, voltage sense/logic unit 40 detects when $V_{out}$ falls below a predetermined level $V_{trigger}$ that is below the rated voltage. When this happens, voltage sense/logic unit 40 delivers a signal that instructs charge current control 129 to reduce the current supplied to battery 13 until the output of AC adapter 10 is again at $V_{trigger}$. Thus, when load 11 and battery 13 together require more than the rated power of AC adapter 10, power is supplied preferentially to load 11 and the power supplied to battery is curtailed until the output voltage of AC adapter is at $V_{trigger}$. As a result, AC adapter 10 is always operating at or near its rated power in this situation.

Figure 6:
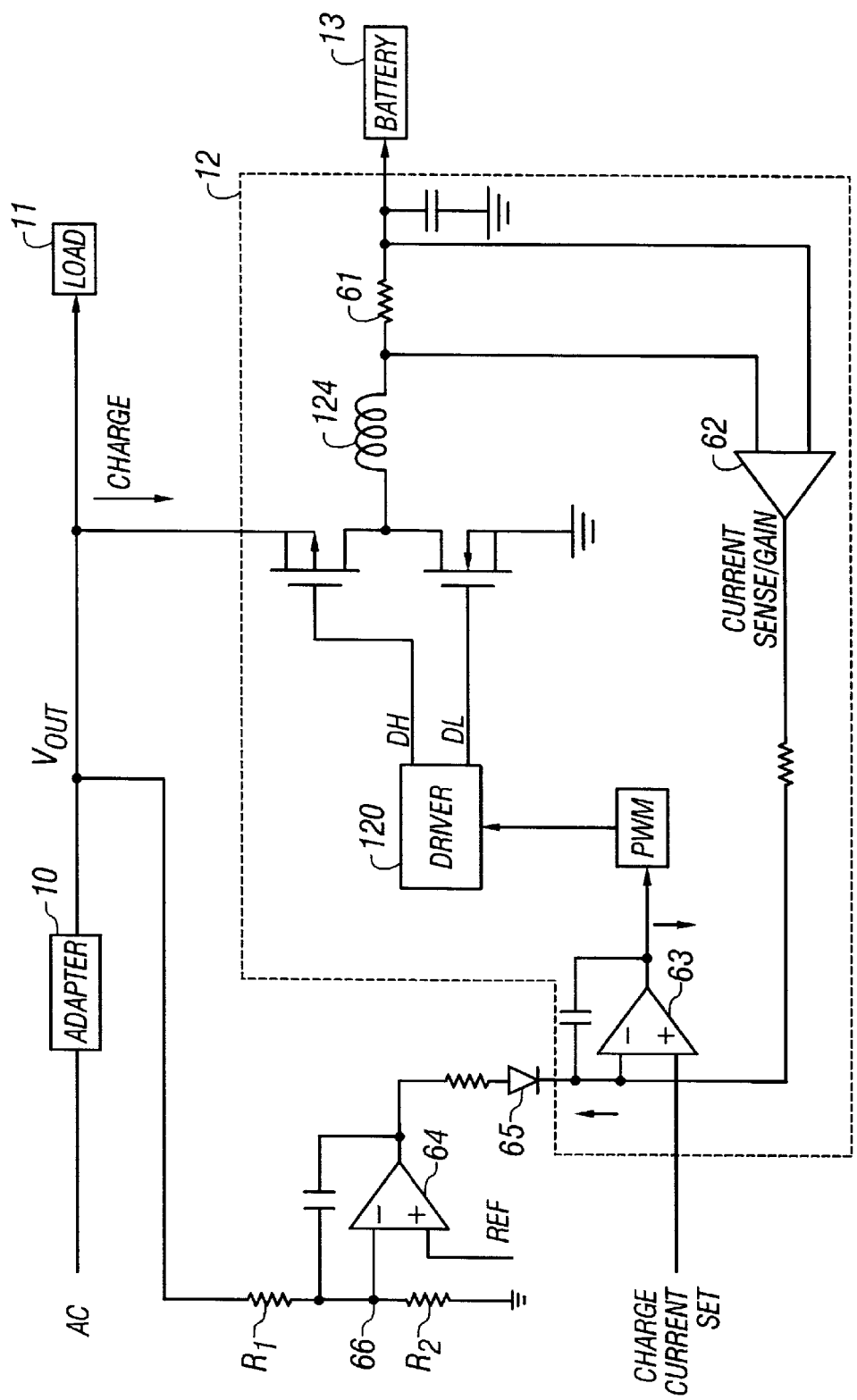
FIG. 6 is a schematic circuit diagram of the arrangement shown in FIG. 4.

FIG. 6 shows a schematic diagram of one circuit implementation of the arrangement shown in FIG. 4. Current detector 127 includes a current sense resistor 61 and a buffer with gain 62, which delivers an output representative of the voltage drop across sense resistor 61. Charge current control 129 includes an error amplifier 63 and a pulse-width modulator 67.

Voltage sense/logic 40 includes resistors R1 and R2, which together form a voltage divider connected between the output terminal of AC adapter 10 and ground. The voltage at the common node 66 between resistors R1 and R2 thus represents $V_{out}$, and is delivered to the inverting input of an error amplifier 64.

When $V_{out}$ is at the rated voltage for AC adapter 10, the voltage at node 66 is high and the output of error amp 64 is low. This voltage is blocked by diode 65, and thus this part of the circuit has no effect on the operation of battery charger 12. On the other hand, when $V_{out}$ falls below $V_{trigger}$, the voltage at node 66 goes low, and the output of error amp 64 goes high. This forward-biases diode 65 and causes the output of error amp 64 to be delivered to the inverting input of error amp 63. This in effect "fools" error amp 63 into thinking that battery charger is delivering too much current, and so it reduces the current output to battery 13. This in turn causes AC adapter 10 to deliver less current to battery charger 12, and the voltage at the output of AC adapter 10 increases (see FIG. 5).

The principles of this invention are applicable to any power source that has an output characteristic similar to the one shown in FIG. 5 and that is used to supply current to both an electrical device and a rechargeable battery. Devices other that DC/DC converters can be used as battery chargers to control the flow of current to the battery, and arrangements other than those shown in FIGS. 4 and 6 can be used to detect the voltage at the output terminal of the power source. This invention is to be interpreted broadly to include all such alternative embodiments.

I claim:

1. A combination comprising:

an AC adapter having an output terminal connected to an electronic device and to a battery charger, the battery charger comprising a current control unit for regulating a magnitude of a current at an output terminal of the battery charger;

a rechargeable battery connected to the output terminal of a voltage detector, the voltage detector being connected to sense the voltage at the output terminal of the AC adapter, and an output terminal of the voltage detector being connected to the current control unit.

2. The combination of claim 1 wherein the voltage detector supplies to the current control unit a signal representing a magnitude of a voltage at the output terminal of the AC adapter.

3. The combination of claim 1 wherein the battery charger comprises a DC/DC stepdown converter.

4. The combination of claim 3 wherein the DC/DC stepdown converter comprises:

a high-side MOSFET and a low-side MOSFET connected in series;

an inductor and a capacitor connected in series between a common node between the high-side and low-side MOSFETs and ground, the output terminal of the battery charger being connected to a common node between the inductor and capacitor; and a driver having output terminals connected to the high-side and low-side MOSFETs and an input terminal connected to an output terminal of the charge current control.

5. The combination of claim 4 wherein the DC/DC stepdown converter comprises a current sense unit connected measure the current at the output terminal of the battery charger, the current sense unit being connected via a feedback loop to a second input terminal of the charge current control.

6. The combination of claim 1 wherein the voltage detector comprises:

a voltage divider comprising first and second resistors connected in series;

a first operational amplifier, an inverting input of the first operational amplifier being connected to a common node between the first and second resistors.

7. The combination of claim 6 wherein a non-inverting input of the first operational amplifier is connected to a first reference voltage representing a voltage rating of the converter.

8. The combination of claim 7 comprising a second operational amplifier, an inverting input of the second operational amplifier being connected through a diode to an output of the first operational amplifier.

9. The combination of claim 8 wherein a non-inverting input of the second operational amplifier is connected to a second reference voltage representing the size of a current at the output terminal of the battery charger.

10. The combination of claim 9 comprising a current sense resistor connected to the output terminal of the battery charger and a current sense amplifier having input terminals connected to the terminals of the current sense resistor, an output terminal of the current sense amplifier being connected to the inverting input of the second operational amplifier.

11. A method of delivering power simultaneously to an electronic device and a rechargeable battery, comprising:

sensing a magnitude of a voltage at an output terminal of a power source; and using the magnitude of the voltage at the output terminal of the power source to regulate a size of a current delivered to the battery.

12. The method of claim 11 wherein the power source is an AC adapter.

* * * * *